US010095599B2

(12) United States Patent
Che et al.

(10) Patent No.: US 10,095,599 B2
(45) Date of Patent: Oct. 9, 2018

(54) OPTIMIZATION FOR APPLICATION RUNTIME MONITORING

(71) Applicant: INTERNATIONAL BUSINESS MACHINES CORPORATION, Armonk, NY (US)

(72) Inventors: Yang Che, Beijing (CN); Xiao Ming Hu, Beijing (CN); Xin Peng Liu, Beijing (CN); Ren Fu Ma, Beijing (CN); Li Jing Mu, Beijing (CN); Guoqing Wang, Beijing (CN); Jun Yu Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 169 days.

(21) Appl. No.: 15/086,885

(22) Filed: Mar. 31, 2016

(65) Prior Publication Data
US 2017/0286253 A1    Oct. 5, 2017

(51) Int. Cl.
*G06F 11/34* (2006.01)
*G06F 11/36* (2006.01)
*G06F 11/30* (2006.01)

(52) U.S. Cl.
CPC ........ *G06F 11/3495* (2013.01); *G06F 11/302* (2013.01); *G06F 11/3466* (2013.01); *G06F 11/3612* (2013.01); *G06F 11/3636* (2013.01)

(58) Field of Classification Search
CPC ............... G06F 11/3495; G06F 11/302; G06F 11/3636; G06F 11/3612; G06F 11/3466
See application file for complete search history.

(56) References Cited

U.S. PATENT DOCUMENTS

| | | | |
|---|---|---|---|
| 6,904,594 B1 * | 6/2005 | Berry | G06F 11/3404 717/130 |
| 7,587,709 B2 | 9/2009 | Chilimbi et al. | |
| 8,473,925 B2 | 6/2013 | Gagliardi et al. | |
| 8,478,948 B2 | 7/2013 | Panchenko et al. | |
| 8,561,176 B1 * | 10/2013 | Dalcher | G06F 11/3604 713/187 |
| 8,589,894 B2 | 11/2013 | Che et al. | |
| 8,782,612 B2 | 7/2014 | Gagliardi et al. | |
| 8,938,729 B2 * | 1/2015 | Martin | G06F 11/3466 717/130 |
| 9,047,412 B2 | 6/2015 | Greifeneder et al. | |
| 9,092,568 B2 | 7/2015 | Rhee et al. | |

(Continued)

*Primary Examiner* — Paul Contino
(74) *Attorney, Agent, or Firm* — Samuel A. Waldbaum

(57) ABSTRACT

This disclosure provides a computer-implemented method for monitoring an application at runtime. The method comprises building up a calling relationship graph for at least one type of system method called at runtime, by checking a stack trace generated when the application is running. An application method of the application that directly or indirectly calls this type of system method is represented as a node in the calling relationship graph. The method further comprises determining one or more target nodes in the calling relationship graph by analyzing the structure of the calling relationship graph. The method further comprises inserting callback methods into application method(s) of the application corresponding to the one or more target nodes only in a calling side. The method further comprises monitoring the application at runtime by using said callback methods.

17 Claims, 5 Drawing Sheets

(56) References Cited

U.S. PATENT DOCUMENTS

| | | | |
|---|---|---|---|
| 9,405,654 B2 * | 8/2016 | Ravindranath Sivalingam | G06F 11/3476 |
| 2008/0004720 A1 | 1/2008 | Mckinney et al. | |
| 2008/0034352 A1 | 2/2008 | McKinney et al. | |
| 2008/0276227 A1 | 11/2008 | Greifeneder | |
| 2013/0104107 A1 * | 4/2013 | De Smet | G06F 11/3636 717/125 |
| 2013/0263095 A1 * | 10/2013 | He | G06F 11/3664 717/129 |
| 2013/0275981 A1 * | 10/2013 | Dalcher | G06F 11/3466 718/100 |
| 2014/0137083 A1 * | 5/2014 | Meagher | G06F 11/3466 717/130 |
| 2014/0215443 A1 * | 7/2014 | Voccio | G06F 11/3612 717/128 |
| 2014/0237454 A1 * | 8/2014 | Delporte | G06F 11/3636 717/128 |
| 2016/0092336 A1 * | 3/2016 | Atanasiu | G06F 11/323 717/133 |
| 2017/0255544 A1 * | 9/2017 | Plate | G06F 11/3636 |

* cited by examiner

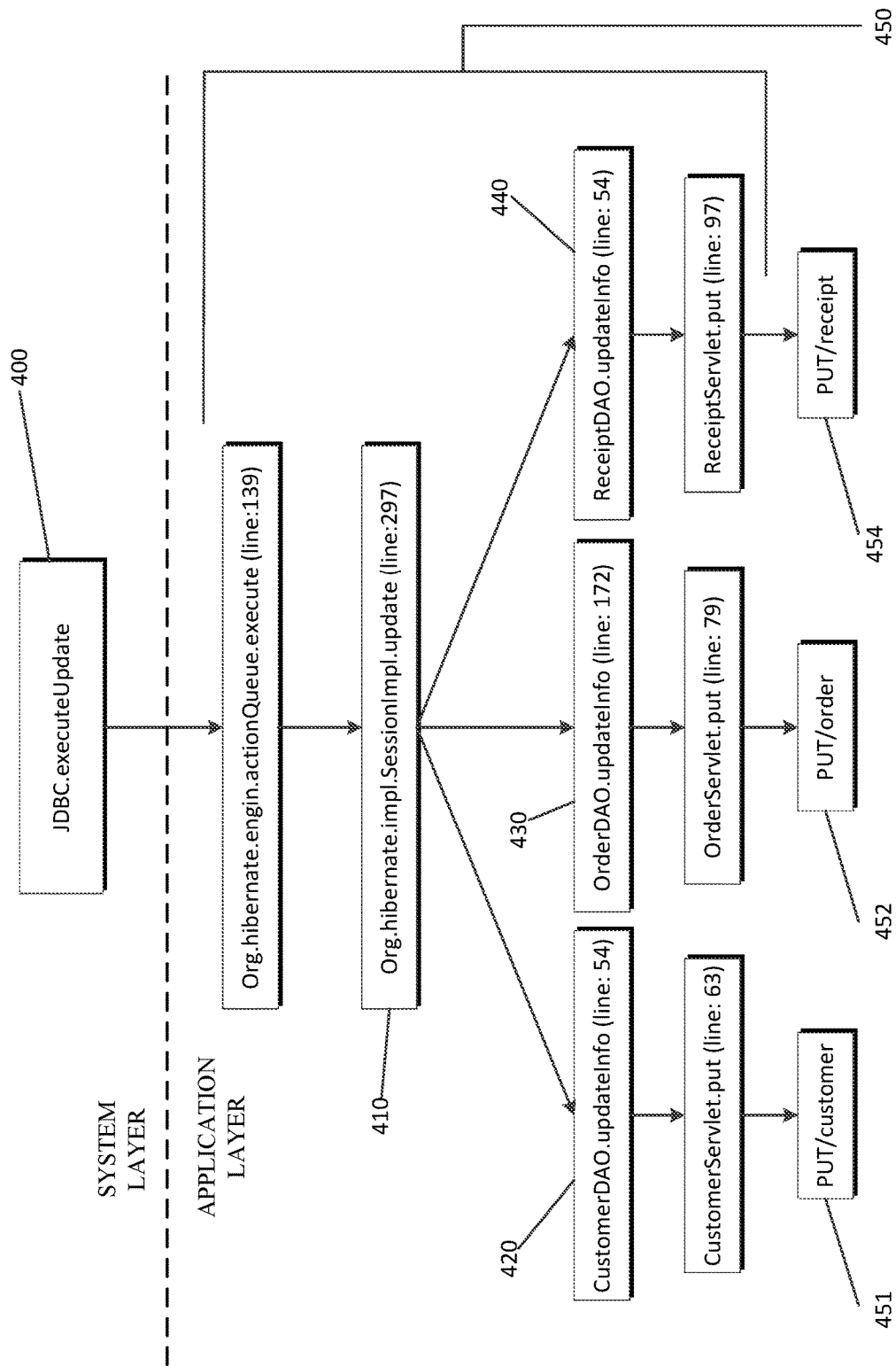

```
public Order updateOrder(final Order order) {

Session session=getSession(); //line number 170 session.update(order); //line number 172 return order; //line number 174
}
```
500

FIG. 5A

```
public Order updateOrder(final Order order) {

Session session=getSession(); //line number 170 try{
        JDBCCallback.beforeExecuteUpdate("OrderDAO","updateOr
der",172,"org.hibernate.Session.update");

session.update(order); //line number 172

JDBCCallback.afterExecuteUpdate("OrderDAO","updateOrd
er",172,"org.hibernate.Session.update");

}catch(Exception exception){
            JDBCCallback.ExecuteUpdateThrowing(exception,
"OrderDAO","updateOrder",172,"org.hibernate.Session.update");
        }
        return order; //line number 174
}
```

OPTIMIZATION FOR APPLICATION RUNTIME MONITORING

BACKGROUND

The present invention relates to the field of system management, and more specifically, to a computer-implemented method, a system and a computer program product for monitoring an application during its operation.

In the field of information technology and system management, Application Performance Management (APM) is used for the monitoring and management of performance and availability of software applications. APM is used to detect and diagnose complex application performance problems to maintain a predetermined level of service.

Program instrumentation are widely used in monitoring tools, optimization tools, and testing tools. Program instrumentation is a process of inserting additional statements into a program for the purpose of gathering information about dynamic behaviors of the program. The program instrumentation is executed during the operation of the program, so that the runtime information of the program can be collected and analyzed. Program instrumentation modifies binary code or byte code, to achieve its goals, such as performance analysis, code optimization, and coverage test analysis.

A simple Java program is shown as below, in which some statements are inserted in order to record the transaction operations, as shown by notes. Actually, all the instrumentations are performed with respect to binary code or byte code, instead of source code. The example code segment is used to just illustrate how code is modified logically.

```
class Simple
{
int i;
public void set (int i)
{
    runtimeRecorder.beforeTransaction(this);//inserted for monitoring a
    transaction
    synchronized(this) {this.i=i;}
    runtimeRecorder.afterTransaction(this); //inserted for monitoring a
    transaction
}
}
```

In an object-oriented programming environment, in order to capture system information that shows the time breakdown and count spent on various system related functionality, such as time spent in doing business logic and count in Enterprise JavaBeans (EJBs), database activity, messaging activity, etc., a monitoring tool will be tailored to the specific classes and methods. If the monitoring tool intends to monitor a Java Name Directory Interface (JNDI) transaction, the monitoring tool will be tailored to the classes and methods according to some configurations and rules, such as implementing the same interface. This system interface stands for a system activity such as the ones using Java Database Connectivity (JDBC), JNDI, Java Message Service (JMS) and etc. Tailored to a class means the class implements a dedicated system interface. Then, entry and exit callback methods are triggered in runtime to collect data of time consumption. The above code segment shows this kind of entry and exit callback methods. When the method Simple.set( ) is called, the entry callback method of runtimeRecorder.beforeTransaction( ) and the exit callback method of runtimeRecorder.afterTransaction( ) will be invoked.

BRIEF SUMMARY

Additional aspects and/or advantages will be set forth in part in the description which follows and, in part, will be apparent from the description, or may be learned by practice of the invention.

Embodiments of the present invention disclose a method, computer program product, and system for monitoring an application at runtime. The method comprises building up a calling relationship graph for at least one type of system method called at runtime, by checking a stack trace generated when the application is running. An application method of the application that directly or indirectly calls this type of system method is represented as a node in the calling relationship graph. The method further comprises determining one or more target nodes in the calling relationship graph by analyzing the structure of the calling relationship graph. The method further comprises inserting callback methods into application method(s) of the application corresponding to the one or more target nodes only in a calling side. The method further comprises monitoring the application at runtime by using said callback methods.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 4 is a block diagram which shows an example of the calling relationship graph for a specific type of system method according to an embodiment of the invention;

FIG. 5A is a block diagram of example code for inserting of callback methods into an application method according to an embodiment of the invention; and FIG. 5B depicts code show an example of the inserting of callback methods into an application method according to an embodiment of the invention.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Figure 1:
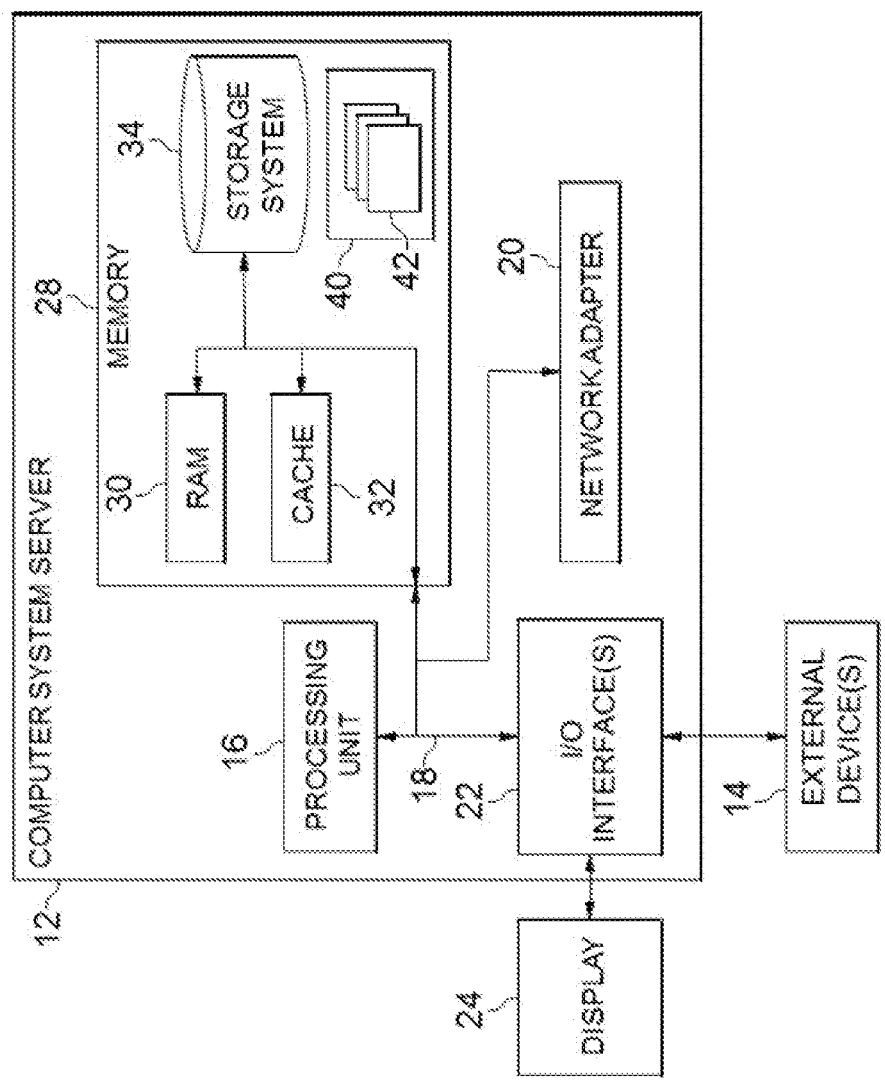
FIG. 1 shows an exemplary computer system which is applicable to implement the embodiments of the present invention.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The following is an example for showing the current instrumentation mechanism. To execute a query in database, it is assumed that there are three classes ClassA, ClassB and ClassC in an application that implement the same interface java.jdbc.Statement having a method named executeQuery( ). ClassA, ClassB and ClassC have a method of executeQuery( ) based on the interface java.jdbc.Statement. It is assumed that, in this application, ClassA.executeQuery( ) calls ClassB.executeQuery( ) and in turn ClassB.executeQuery( ) calls ClassC.executeQuery( ). According to the instrumentation mechanism, callback methods are instrumented in all of the three methods of executeQuery( ) from the three classes. In this case, if a request triggers the execution of ClassA.executeQuery( ) all of the three methods of executeQuery( ) will be executed in cascade, which in turn causes duplicate callback methods instrumented in the three methods to be invoked.

Additionally, although callback methods instrumented in the three methods of executeQuery( ) are all invoked, it is necessary to judge and avoid doing monitoring work in a nested callback method. In the above example, when a callback method is invoked, it is necessary to judge in it if it is invoked in a top level method (e.g., when the callback method is invoked in ClassA.executeQuery( ). If so, the monitoring work will be done, and if not (e.g., when the callback method is invoked in ClassB.executeQuery( ) or ClassC.executeQuery( )), the monitoring work will be skipped. Due to the above facts, the instrumentation mechanism is accompanied by significant performance overhead.

Figure 2:
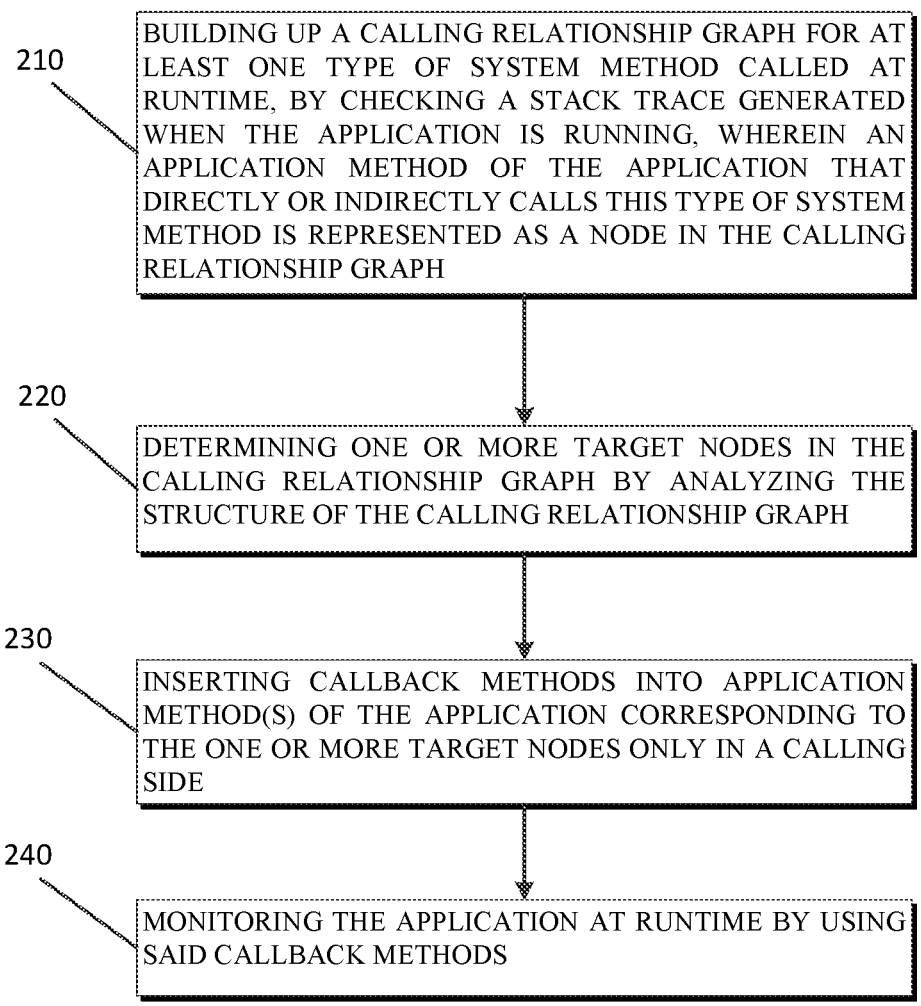
FIG. 2 is a flowchart illustrating a computer-implemented method for monitoring an application at runtime according to an embodiment of the present invention.

With reference now to FIG. 2, FIG. 2 is a flowchart illustrating a computer-implemented method for monitoring an application at runtime according to an embodiment of the present invention. As shown in FIG. 2, the computer-implemented method for monitoring an application at runtime includes a graph building up step 210, a target node determining step 220, a callback method inserting step 230 and a monitoring step 240. Hereinafter, respective steps of the method for monitoring an application at runtime in the FIG. 2 are explained in detail.

The method in FIG. 2 starts in an environment using the instrumentation mechanism in which methods from different classes implementing the same specific interface are all instrumented with callback methods. In response to a caller, the instrumented method is called, the callback methods in this instrumented method is called, and in turn the callback methods in other instrumented methods called by the caller are called in cascade. That is, the method in FIG. 2 starts when the application instrumented according to the instrumentation mechanism starts to run. When the graph building up step 210 in the runtime ends, information obtained is analyzed in the target node determining step 220 and is used to replace the original instrumentation with a new one in the callback method inserting step 230. Finally, in the monitoring step 240, the new instrumentation is used to monitor the application at runtime.

Specifically, in the graph building up step 210, a graph for at least one type of system method called at runtime is built up by checking a stack trace generated when the application is running. This graph is referred to as a calling relationship graph hereinafter, since it reflects calling relationship among methods. Although a graph is used here as an example to represent the calling relationship among methods, the present application is not thus limited. Another data structure may be used as long as it can reflect calling relationship among methods, in which case it is still the graph of this invention. The calling relationship graph is composed of nodes and edges connecting the nodes. In one embodiment of the invention, the calling relationship graph can have a tree structure. An application method of the application that directly or indirectly calls this type of system method is represented as a node in the calling relationship graph. In this specification, a method of a system class is called system method, and a method of an application class is called application method. The definitions of system class and application class will be described later.

When an application is running, a stack will be generated for a thread or a process of the application. The stack trace is a snapshot of content of the stack at the time of checking. In the stack trace, both of system methods and application methods will be recorded. Sometimes, system methods and application methods are interleaved in the stack trace. To build up the calling relationship graph, it would be better to distinguish system methods and application methods in the stack trace. In one embodiment of the invention, in the stack trace, a system method or a system class is filtered out by matching name of the class or the method in the stack trace with a list of application classes whose information is recorded while being loaded. The filtering can be based on at least one of class and method.

In one embodiment of the invention, a list of application classes is recorded while every class is being loaded at runtime. To create the list, a judging logic can be inserted in an existing Class Instrumentation hooker, which will be triggered to execute in response to a class loading event, to determine if the class being loaded is an application class. In one embodiment of the invention, the class images are checked to make the determination. In one example, if a class image is loaded by an application class loader, it can be determined that this class is an application class. In another example, if a class image is loaded from an application deployment directory, it can be determined that this class is an application class. In a further example, other information about a class can be used to make the determination. A class that is not in the list is determined as a system class. Application classes are in a layer called application layer here. System classes are in a layer called system layer here. If a class is determined as being from the application layer, the information of the class including at least name of the class will be recorded in the list. In another example, names of the methods of a class from the application layer are also recorded in the list. In this way, information of all the application classes loaded at runtime is recorded in the list.

As described above, the method in FIG. 2 is performed in an environment using the current instrumentation mechanism, so callback monitoring methods are instrumented in all methods implementing the same interface. In one embodiment of the invention, the stack trace may be generated in an existing monitoring callback method in a system method if the system method is not a nested system method. That is, the stack trace generation is done in an existing callback method in a system method and this existing callback method is the one that collects performance metrics. Taking the example described in the background section as an example, only in a top level method ClassA.executeQuery( ) the monitoring work will be done in the callback method, that is, the performance metrics will be collected there. Only when the performance metrics are being collected, the stack trace is generated. In other words, stack trace is not generated in the existing callback methods in ClassB.executeQuery( ) and ClassC.executeQuery( ) since they are nested system methods.

With respect to the current instrumentation mechanism, no matter who the caller is, the performance metrics are collected. However, if the request that triggers the performance monitoring is from the inside of the system, the collected performance metrics are useless since they have nothing to do with an application and users of the application. To reduce the overhead of the monitoring, in one embodiment of the invention, the stack trace may be generated in an existing monitoring callback method in a system method if the system method is not a nested system method and an edge request of the current thread or process is originated from an application call. In this specification, the edge request indicates a request initiated by a user.

Figures 3A, 3B:
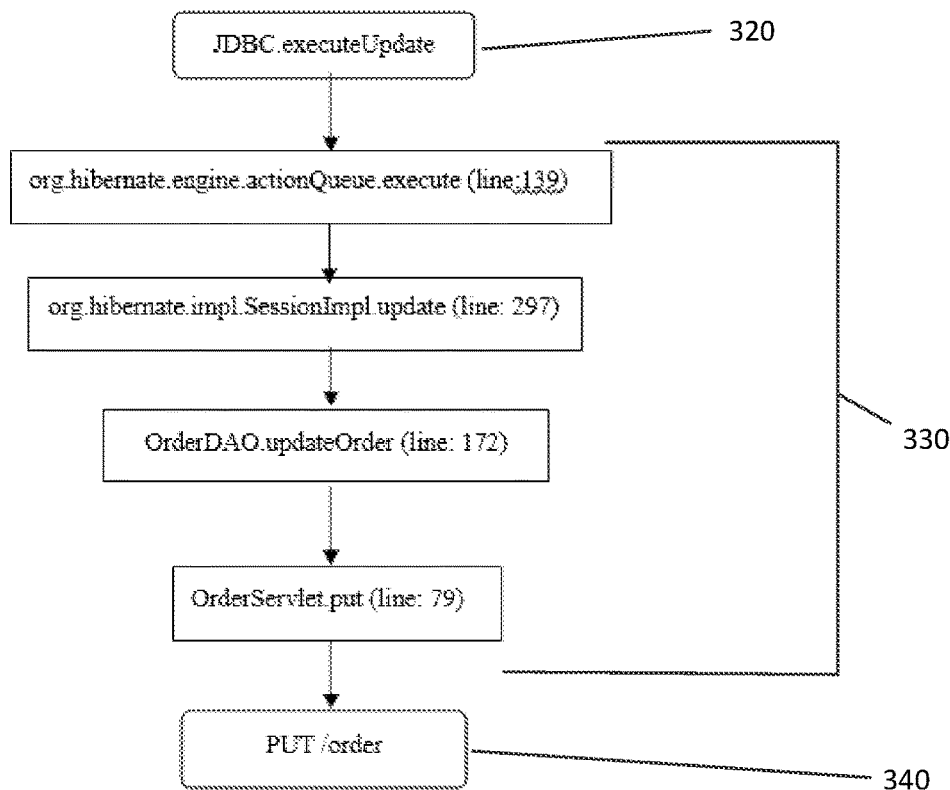
FIGS. 3A and 3B are schematic diagrams showing how to build up a calling relationship graph from a stack trace according to an embodiment of the invention.

FIGS. 3A and 3B are a schematic diagram showing how to build up a calling relationship graph from a stack trace according to an embodiment of the invention. FIG. 3A is a snapshot of a stack trace 310. Stack trace 310 includes multiple lines of code, wherein each line of the code includes a line number indicator to provide the location of the code within the application/system. FIGS. 3A, 3B, 4, 5A and 5B all illustrate the line numbers for each line of the code to provide the location of the code within the application/system In the snapshot, in the top row of the stack trace 310, class zc is a JDBC object, and the system method zc.executeUpdate( ) is a top level system method in the application layer, that is, the system method zc.executeUpdate( ) is at the boundary between the application layer and the system layer and is at the side of system layer. As described above, to avoid duplicate invoking, a stack trace is generated only in this kind of top level system method. When a stack trace is generated, by matching names of classes in the stack trace with a list of application classes whose information is recorded while being loaded, classes and methods in the stack trace with names for which a match cannot be found in the list will be deleted from the stack trace. In FIG. 3A, for example, since for WSjdbcStatement.executeUpdate( ) in the second and third rows, HttpServlet( ) in the eighth row, ServletWrapper.handleRequest( ) in the ninth row and ThreadPool$Worker.run( ) in the tenth row of the stack trace 310, a match cannot be found in the list of application classes, they are all deemed as system methods and not from an application class, and are thus deleted from the stack trace 310, as shown by strike through. Please note that, in one example, although the system method zc.executeUpdate( ) is not an application method, it is not deleted and will be used as a root node.

In one embodiment of the invention, building up a calling relationship graph for at least one type of system method called at runtime may further comprise, whenever a stack trace is generated: setting each of the application methods in the stack trace as a node; setting edges each starting from a called application method to a caller application method; setting the type of the current system method as the root node and adding a leaf node containing information of the edge request, so that a path from the root node to the leaf node is formed; and adding the path to the calling relationship graph for the type of the current system method. In another embodiment of the invention, it is not necessary to add a leaf node, and a node corresponding to a top level application method itself may be deemed as a leaf node.

In FIG. 3B, the application methods of actionQueue.execute( ), SessionImpl.update( ), OrderDAO.updateOrder( ) and OrderServlet.put( ) in the stack trace in FIG. 3A are set as nodes in a path which has edges each starting from a called method to its calling method. FIG. 3A illustrates three types of nodes; a root node, a leaf node, and a node in the path. A root node is an abstract node represents the system call type which is derived from the stack trace 310. There is no line number or reference for such node. A leaf node is an abstract node used to denote the edge request from the perspective of the application, which is derived from the stack trace 310. There is no line number or reference for such node. A node 330 in the path is the application layer method in the stack trace 310, is also called as candidate invokers. The code zc.executeUpdate( ) is JDBC.executeUpdate 320 is a system call type, which is set as a root node. A leaf node including information of the edge request of this thread or process is added to the path. In this case, the edge request is PUT 340 and it comes from the position of "/order" 340. Other examples of the edge request include GET, POST, DELETE and etc. according to HTTP specification. In one embodiment of the invention, each of the nodes in the path may include at least information such as a class name and a method name for a corresponding application method, and a line number of a monitored method corresponding to its parent node. At this time, a path of the calling relationship graph is formed. Other edge requests received in this application may also causes the execution of the same type of system method, such as JDBC.executeUpdate( ) and thus other paths of the calling relationship graph will be formed. If all of the paths are merged, the calling relationship graph for this type of system method is built up.

FIG. 4 shows an example of the calling relationship graph for a specific type of system method according to an embodiment of the invention. In FIG. 4, the final calling relationship graph for the type of system method JDBC.executeUpdate 400 is a system call type, and has three branches 450 which are candidate invokers and is merged from the three paths. The middle path of the calling relationship graph in FIG. 4 corresponds to the path shown in FIG. 3B result from edge request, such as PUT at "/Order" 452. The other two paths are formed by calling the same type of system method resulting from other edge requests, such as PUT at "/customer" 451 and PUT at "/receipt" 454. The broken line in FIG. 4 shows the boundary of the system layer and the application layer. It can be seen that, the root node JDBC.executeUpdate 400, is the system call type, is the top level system method, and other system methods directly or indirectly called by it are nested system methods, which are not shown in this graph. The methods called in cascade in the application layer are application methods.

Returning back to refer to FIG. 2, in the target node determining step 220, one or more target nodes in the calling relationship graph is determined by analyzing the structure of the calling relationship graph. According to one embodiment of the invention, determining one or more target nodes in the calling relationship graph by analyzing the structure of the calling relationship graph may further include if the root node has more than one child, determining its child nodes as target nodes, if the calling relationship graph has only one path, determining the child node of the root node as the target node, otherwise, searching a first node having more than one child in the calling relationship graph in depth-first order, and determining child nodes of the first node as the target nodes.

Taking the calling relationship graph in FIG. 4 as an example, the root node JDBC.executeUpdate has only one child, however, this graph has more than one path. Thus, it needs to search in the graph in depth-first order to find a node having more than one child. As the result of the search, a node 410 may be determined as the first node having more than one child, and its child nodes 420, 430 and 440 are determined to be target nodes. Here, the target nodes correspond to methods to be instrumented. All of the methods to be instrumented are callers of the method corresponding to their same parent node.

In one embodiment of the invention, information of a target node is recorded, which includes at least a class name (of invoker class) and a method name (of invoker method) for the target node, and a line number of a monitored method corresponding to its parent node. The recorded information may also include a type of system method for the calling relationship graph, and a name of the method to be monitored. Taking the graph shown in FIG. 4 as an example, the information recorded for the determined target nodes 420, 430, and 440 may be of the following form.

TABLE 1

| System Method Type | Invoker Class | Invoker Method | Line Number | Monitored Method |
|---|---|---|---|---|
| JDBC.executeUpdate | CustomerDAO | updateInfo | 54 | SessionImpl.update |
| JDBC.executeUpdate | OrderDAO | updateOrder | 172 | SessionImpl.update |
| JDBC.executeUpdate | ReceiptDAO | updateInfo | 54 | SessionImpl.update |

The recorded information may include information more or less than the information described above, and it is sufficient as long as an instrument position can be determined.

In another embodiment of the invention, other nodes may be determined as target nodes. For example, a first searched node having more than one child may be determined as a target node. Taking the graph shown in FIG. 4 as an example, the node 410 may be determined as a target node. In a further embodiment of the invention, a parent node of the node 410 may be determined as a target node if it is not a system method. In both of the two cases, only one node is determined as a target node.

Returning back to refer to FIG. 2, in the callback method inserting step 230, callback methods are inserted into application method(s) of the application corresponding to the one or more target nodes only in a calling side. The inserting may further comprise, for each target node, inserting callback methods before and after a monitored method, which corresponds to the parent node of the target node in the calling relationship graph, in the calling method corresponding to the target node.

In one embodiment of the invention, in an interpreting and executing environment, the above recorded position information is used to modify Byte Code Instrument (BCI) configuration to indicate the instrument position. A virtual machine or an interpreter will instrument the application based on the modified BCI configuration for monitoring. That is, the instrumentation is based on byte code. In another embodiment of the invention, in a compiling and executing environment, a compiler will insert extra code into the source code of the application for monitoring. In either of the two cases, logically, callback monitoring methods are to be inserted into the application.

Instead of inserting a pair of callback monitoring methods at the beginning and the end of the body of a monitored method to monitor its behaviors as in the prior art, in the embodiment of the invention, a pair of callback monitoring methods are inserted in its calling method immediately before and after the calling statement of this monitored method.

FIGS. 5A and 5B show an example of the inserting of callback methods into an application method according to an embodiment of the invention. In FIG. 5A, the original code 500 of an application method OrderDAO.updateOrder( ) is shown as an example. In FIG. 5B, the application method OrderDAO.updateOrder( ) after instrumentation is shown. With the information in Table 1 (the $2^{nd}$ row), the instrument position is known to be line number 172 (shown in FIG. 5A) in OrderDAO.updateOrder( ). Thus, two callback monitoring methods are inserted to wrap the statement in line number 172. One callback monitoring method JDBCCallback.beforeExecuteUpdate( ) 510 is inserted before line number 172 as illustrated in FIG. 5B, and the other callback monitoring method JDBCCallback.afterExecuteUpdate( ) 520 is inserted after line number 172, as illustrated in FIG. 5B. An optional exception processing part 530 is also inserted, as illustrated in FIG. 5B. FIG. 5B is an example and the callback methods are not limited to the form shown in FIG. 5B. For the example shown in FIG. 4, although FIG. 5B only shows the instrumentation for one instrument position in Table 1, instrumentation should be done with respect to all of the three instrument positions in Table 1.

In the monitoring step 240, the application is monitored at runtime by using said callback methods. Here, the BCI configuration only includes the instrument positions obtained in the step 220, and original BCI configuration is overwritten. That is, callback methods instrumented according to the original instrumentation mechanism are all removed. For example, the callback methods in the top level system method zc.executeUpdate( ) (FIG. 3A) and in all the nested system methods do not exist anymore.

In one aspect of the invention, since in one path, there is only one method that is instrumented, a request will not cause duplicate callback methods to be invoked and the overhead of runtime monitoring will be reduced. In another aspect of the invention, since it is not necessary to make a judgment at runtime in each callback method in nested calls to avoid duplicate information collecting, the overhead of runtime monitoring will be reduced. In a further aspect of the invention, since in one embodiment of the invention, it is judged if an edge request of the current thread or process is originated from an application call, and edge request that is not originated from an application call is filtered out and information is not collected for this kind of request, the overhead of runtime monitoring will be further reduced.

Although the example in FIGS. 5A and 5B shows that the calling relationship graph has a tree structure, it does not necessarily have a tree structure. For example, an application method abc( ) may call two different methods such as login( ) and logout( ) and both of the methods login( ) and logout( ) further call a method executeQuery( ). In this case, both of two paths for login( ) and logout( ) in a graph for the type of executeQuery will connect to a same node corresponding to the application method abc( ). Thus, the calling relationship graph has a cycle and is not a tree.

The present invention may be a system, a method, and/or a computer program product. The computer program product may include a computer readable storage medium (or media) having computer readable program instructions thereon for causing a processor to carry out aspects of the present invention.

In an embodiment of the present invention, there is provided a system for monitoring an application at runtime. The system comprises one or more processors and a memory coupled to at least one of the one or more processors. The system further comprises a set of computer program instructions stored in the memory and executed by at least one of the one or more processors in order to perform an action of building up a calling relationship graph for at least one type of system method called at runtime, by checking a stack trace generated when the application is running. An application method of the application that directly or indirectly calls this type of system method is represented as a node in the calling relationship graph. The system further comprises a set of computer program instructions stored in the memory and executed by at least one of the processors in order to perform an action of determining one or more target nodes in the calling relationship graph by analyzing the structure of the calling relationship graph. The system further comprises a set of computer program instructions stored in the memory and executed by at least one of the processors in order to perform an action of inserting callback methods into application method(s) of the application corresponding to the one or more target nodes only in a calling side. The system further comprises a set of computer program instructions stored in the memory and executed by at least one of the processors in order to perform an action of monitoring the application at runtime by using said callback methods.

In one embodiment of the system, in the stack trace a system method or a system class is filtered out by matching name of the class or the method in the stack trace with a list of application classes whose information is recorded while being loaded.

In one embodiment of the system, the stack trace is generated in an existing monitoring callback method in a system method if the system method is not a nested system method.

In one embodiment of the system, the stack trace is generated in an existing monitoring callback method in a system method if the system method is not a nested system method and an edge request of the current thread or process is originated from an application call.

In one embodiment of the system, to build up a calling relationship graph for at least one type of system method called at runtime, the set of computer program instructions being stored in the memory and executed by at least one of the one or more processors in order to perform actions of, whenever a stack trace is generated: setting each of the application methods in the stack trace as a node; setting edges each starting from a called application method to a caller application method; setting the type of the current system method as the root node and adding a leaf node containing information of the edge request, so that a path from the root node to the leaf node is formed; and adding the path to the calling relationship graph for the type of the current system method.

In one embodiment of the system, to determine one or more target nodes in the calling relationship graph by analyzing the structure of the calling relationship graph, the set of computer program instructions being stored in the memory and executed by at least one of the one or more processors in order to perform actions of: if the root node has more than one child, determining its child nodes as target nodes; if the calling relationship graph has only one path, determining the child node of the root node as the target node; otherwise searching a first node having more than one child in the calling relationship graph in depth-first order, and determining child nodes of the first node as the target nodes.

In one embodiment of the system, to insert callback methods, the set of computer program instructions being stored in the memory and executed by at least one of the one or more processors in order to perform actions of: for each target node, inserting callback methods before and after a monitored method, which corresponds to the parent node of the target node in the calling relationship graph, in the calling method corresponding to the target node.

In an embodiment of the present invention, there is provided a computer program product for monitoring an application at runtime. The computer program product comprises a computer readable storage medium having program instructions embodied therewith. The program instructions being executable by a device to perform a method. The method comprises building up a calling relationship graph for at least one type of system method called at runtime, by checking a stack trace generated when the application is running. An application method of the application that directly or indirectly calls this type of system method is represented as a node in the calling relationship graph. The method further comprises determining one or more target nodes in the calling relationship graph by analyzing the structure of the calling relationship graph. The method further comprises inserting callback methods into application method(s) of the application corresponding to the one or more target nodes only in a calling side. The method further comprises monitoring the application at runtime by using said callback methods.

In one embodiment of the computer program product, in the stack trace a system method or a system class is filtered out by matching name of the class or the method in the stack trace with a list of application classes whose information is recorded while being loaded.

In one embodiment of the computer program product, the stack trace is generated in an existing monitoring callback method in a system method if the system method is not a nested system method.

In one embodiment of the computer program product, the stack trace is generated in an existing monitoring callback method in a system method if the system method is not a nested system method and an edge request of the current thread or process is originated from an application call.

In one embodiment of the computer program product, building up a calling relationship graph for at least one type of system method called at runtime further comprising, whenever a stack trace is generated: setting each of the application methods in the stack trace as a node; setting edges each starting from a called application method to a caller application method; setting the type of the current system method as the root node and adding a leaf node containing information of the edge request, so that a path from the root node to the leaf node is formed; and adding the path to the calling relationship graph for the type of the current system method.

In one embodiment of the computer program product, determining one or more target nodes in the calling relationship graph by analyzing the structure of the calling relationship graph further comprising: if the root node has more than one child, determining its child nodes as target nodes; if the calling relationship graph has only one path, determining the child node of the root node as the target node; otherwise searching a first node having more than one child in the calling relationship graph in depth-first order, and determining child nodes of the first node as the target nodes.

In one embodiment of the computer program product, inserting callback methods further comprising: for each target node, inserting callback methods before and after a monitored method, which corresponds to the parent node of the target node in the calling relationship graph, in the calling method corresponding to the target node.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Based on the foregoing, a computer system, method, and computer program product have been disclosed. However, numerous modifications and substitutions can be made without deviating from the scope of the present invention. Therefore, the present invention has been disclosed by way of example and not limitation.

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A computer-implemented method for monitoring an application at runtime, comprising:
 building up a calling relationship graph for a system method called at runtime, by checking a stack trace generated when the application is running, wherein an application method of the application that directly or indirectly calls the system method is represented as a node in the calling relationship graph, wherein in the stack trace a system method or a system class is filtered out by matching name of the class or the method in the stack trace with a list of application classes whose information is recorded while being loaded;
 determining one or more target nodes in the calling relationship graph by analyzing the structure of the calling relationship graph;
 inserting callback methods into the application method of the application corresponding to the one or more target nodes only in a calling side; and
 monitoring the application at runtime by using the callback methods.

2. The computer-implemented method according to claim 1, wherein the stack trace is generated in an existing monitoring callback method in a system method when the system method is not a nested system method.

3. The computer-implemented method according to claim 1, wherein the stack trace is generated in an existing monitoring callback method in a system method when the system method is not a nested system method and an edge request of the current thread or process is originated from an application call.

4. The computer-implemented method according to claim 3, wherein building up a calling relationship graph for the system method called at runtime further comprising, whenever a stack trace is generated the method further comprises:
- setting the application method in the stack trace as a node;
- setting edges each starting from a called application method to a caller application method;
- setting the type of the current system method as the root node and adding a leaf node containing information of the edge request, so that a path from the root node to the leaf node is formed; and
- adding the path to the calling relationship graph for the system method.

5. The computer-implemented method according to claim 1, wherein determining one or more target nodes in the calling relationship graph by analyzing the structure of the calling relationship graph further comprising:
- in response to determining that the root node has more than one child, then determining its child nodes as target nodes;
- in response to determining the calling relationship graph has only one path, then determining the child node of the root node as the target node;
- otherwise searching a first node having more than one child in the calling relationship graph in depth-first order, and then determining child nodes of the first node as the target nodes.

6. The computer-implemented method according to claim 5, wherein inserting callback methods further comprising:
- for each target node, inserting the callback methods before and after a monitored method, which corresponds to a parent node of the target node in the calling relationship graph, in the calling method corresponding to the target node.

7. A system for monitoring an application at runtime, comprising:
- one or more computer processors, one or more computer-readable storage media, and program instructions stored on one or more of the computer-readable storage media for execution by at least one of the one or more processors, the program instructions comprising:
  - building up a calling relationship graph for a system method called at runtime, by checking a stack trace generated when the application is running, wherein an application method of the application that directly or indirectly calls the system method is represented as a node in the calling relationship graph, wherein in the stack trace a system method or a system class is filtered out by matching name of the class or the method in the stack trace with a list of application classes whose information is recorded while being loaded;
  - determining one or more target nodes in the calling relationship graph by analyzing the structure of the calling relationship graph;
  - inserting callback methods into the application method of the application corresponding to the one or more target nodes only in a calling side; and
  - monitoring the application at runtime by using said callback methods.

8. The system according to claim 7, wherein the stack trace is generated in an existing monitoring callback method in a system method when the system method is not a nested system method.

9. The system according to claim 7, wherein the stack trace is generated in an existing monitoring callback method in a system method when the system method is not a nested system method and an edge request of the current thread or process is originated from an application call.

10. The system according to claim 9, wherein to build up a calling relationship graph for at least one type of system method called at runtime, the set of computer program instructions being stored in the memory and executed by at least one of the one or more processors in order to perform actions of, whenever a stack trace is generated the method further comprises:
- setting the application method in the stack trace as a node;
- setting edges each starting from a called application method to a caller application method;
- setting the type of the current system method as the root node and adding a leaf node containing information of the edge request, so that a path from the root node to the leaf node is formed; and
- adding the path to the calling relationship graph for the system method.

11. The system according to claim 7, wherein to determine one or more target nodes in the calling relationship graph by analyzing the structure of the calling relationship graph, the set of computer program instructions being stored in the memory and executed by at least one of the one or more processors in order to perform actions of:
- in response to determining that the root node has more than one child, then determining its child nodes as target nodes;
- in response to determining the calling relationship graph has only one path, then determining the child node of the root node as the target node;
- otherwise searching a first node having more than one child in the calling relationship graph in depth-first order, and then determining child nodes of the first node as the target nodes.

12. The system according to claim 11, wherein to insert callback methods, the set of computer program instructions being stored in the memory and executed by at least one of the one or more processors in order to perform actions of:
- for each target node, inserting callback methods before and after a monitored method, which corresponds to the parent node of the target node in the calling relationship graph, in the calling method corresponding to the target node.

13. A computer program product for monitoring an application at runtime, the computer program product comprising:
- one or more non-transitory computer-readable storage media and program instructions stored on the one or more non-transitory computer-readable storage media, the program instructions comprising:
  - building up a calling relationship graph for a system method called at runtime, by checking a stack trace generated when the application is running, wherein an application method of the application that directly or indirectly calls the system method is represented as a node in the calling relationship graph, wherein in the stack trace a system method or a system class is filtered out by matching name of the class or the method in the stack trace with a list of application classes whose information is recorded while being loaded;
  - determining one or more target nodes in the calling relationship graph by analyzing the structure of the calling relationship graph;
  - inserting callback methods into the application method of the application corresponding to the one or more target nodes only in a calling side; and monitoring the application at runtime by using said callback methods.

14. The computer program product according to claim 13, wherein the stack trace is generated in an existing monitoring callback method in a system method if the system method is not a nested system method and an edge request of the current thread or process is originated from an application call.

15. The computer program product according to claim 14, wherein building up a calling relationship graph for at least one type of system method called at runtime further comprising, whenever a stack trace is generated the method further comprises:
- setting the application method in the stack trace as a node;
- setting edges each starting from a called application method to a caller application method;
- setting the type of the current system method as the root node and adding a leaf node containing information of the edge request, so that a path from the root node to the leaf node is formed; and
- adding the path to the calling relationship graph for the type of the current system method.

16. The computer program product according to claim 13, wherein determining one or more target nodes in the calling relationship graph by analyzing the structure of the calling relationship graph further comprising:
- in response to determining that the root node has more than one child, then determining its child nodes as target nodes;
- in response to determining the calling relationship graph has only one path, then determining the child node of the root node as the target node;
- otherwise searching a first node having more than one child in the calling relationship graph in depth-first order, and then determining child nodes of the first node as the target nodes.

17. The computer program product according to claim 16, wherein inserting callback methods further comprising:
- for each target node, inserting callback methods before and after a monitored method, which corresponds to the parent node of the target node in the calling relationship graph, in the calling method corresponding to the target node.

* * * * *